United States Patent
Diebolt et al.

(10) Patent No.: US 9,934,014 B2
(45) Date of Patent: Apr. 3, 2018

(54) AUTOMATIC PURPOSED-APPLICATION CREATION

(71) Applicant: Apple Inc., Cupertino, CA (US)

(72) Inventors: Kyle A. Diebolt, Santa Clara, CA (US); Mehdi Ziat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/825,052

(22) Filed: Aug. 12, 2015

(65) Prior Publication Data

US 2016/0054989 A1   Feb. 25, 2016

Related U.S. Application Data

(60) Provisional application No. 62/171,503, filed on Jun. 5, 2015, provisional application No. 62/040,941, filed on Aug. 22, 2014.

(51) Int. Cl.
*G06F 9/445* (2006.01)
*H04L 29/06* (2006.01)
(Continued)

(52) U.S. Cl.
CPC ............. *G06F 8/61* (2013.01); *G06F 8/65* (2013.01); *G06F 21/57* (2013.01); *H04L 9/3247* (2013.01);
(Continued)

(58) Field of Classification Search
CPC ...................................... G06F 8/61; G06F 8/65
(Continued)

(56) References Cited

U.S. PATENT DOCUMENTS

| | | | |
|---|---|---|---|
| 5,887,163 A | | 3/1999 | Nguyen et al. |
| 6,005,942 A | * | 12/1999 | Chan ............... G06F 21/51 235/379 |

(Continued)

FOREIGN PATENT DOCUMENTS

| | | |
|---|---|---|
| EP | 2605202 | 6/2013 |
| WO | WO 9843212 | 10/1998 |

(Continued)

OTHER PUBLICATIONS

Alimi et al., "Post-distribution provisioning and personalization of a payment application on a UICC-based Secure Element", 2009.*
(Continued)

*Primary Examiner* — Phillip H Nguyen
(74) *Attorney, Agent, or Firm* — Sterne, Kessler, Goldstein & Fox P.L.L.C.

(57) ABSTRACT

An electronic device (such as a cellular telephone) automatically installs and optionally personalizes a purposed application (which is sometimes referred to as an 'applet') on a secure element in the electronic device (which is sometimes referred to as 'applet creation'). In particular, when a digitally signed installation package containing the applet is received from an installing device (such as a server), the secure element verifies the digital signature of the installation package using an encryption key associated with a vendor of the secure element. Then, the secure element installs the applet. In addition, the secure element may optionally export user data from another applet installed on the secure element. Moreover, the secure element may personalize the installed applet using the user data from the other applet. In this way, the electronic device provides a scalable installation solution while allowing personalization from the other applet.

20 Claims, 11 Drawing Sheets

(51) Int. Cl.
*H04L 9/32* (2006.01)
*G06F 21/57* (2013.01)
*H04W 12/04* (2009.01)
*H04W 12/10* (2009.01)

(52) U.S. Cl.
CPC ............. *H04L 63/12* (2013.01); *H04W 12/04* (2013.01); *H04W 12/10* (2013.01)

(58) Field of Classification Search
USPC ................................. 717/173, 177, 178, 172
See application file for complete search history.

(56) References Cited

U.S. PATENT DOCUMENTS

| | | | |
|---|---|---|---|
| 6,718,549 B1 * | 4/2004 | Narin | G06F 8/65 709/203 |
| 6,775,823 B2 | 8/2004 | MacDonell | |
| 6,792,564 B2 | 9/2004 | Ahrens, Jr. et al. | |
| 6,880,084 B1 * | 4/2005 | Brittenham | G06F 21/77 705/66 |
| 7,127,456 B1 | 10/2006 | Brown et al. | |
| 7,191,364 B2 | 3/2007 | Hudson et al. | |
| 7,496,757 B2 * | 2/2009 | Abbott | G06F 21/51 713/164 |
| 7,506,375 B2 | 3/2009 | Kanda et al. | |
| 7,519,630 B2 | 4/2009 | Brown et al. | |
| 7,526,561 B2 | 4/2009 | Bloch et al. | |
| 8,150,808 B2 | 4/2012 | Zha et al. | |
| 8,176,321 B1 * | 5/2012 | Perry | G06F 21/53 713/167 |
| 8,296,756 B1 | 10/2012 | Feeser et al. | |
| 8,578,214 B2 | 11/2013 | Dufour et al. | |
| 8,606,765 B2 | 12/2013 | Boggs et al. | |
| 8,745,612 B1 * | 6/2014 | Semenzato | G06F 8/65 717/170 |
| 8,826,260 B2 * | 9/2014 | Ran | G06F 8/60 717/168 |
| 9,317,689 B2 * | 4/2016 | Aissi | G06F 21/30 |
| 2002/0124213 A1 | 9/2002 | Ahrens, Jr. et al. | |
| 2003/0023966 A1 | 1/2003 | Shimizu et al. | |
| 2003/0070162 A1 | 4/2003 | Oshima et al. | |
| 2003/0111528 A1 * | 6/2003 | Sato | G06Q 20/105 235/380 |
| 2004/0127196 A1 * | 7/2004 | Dabbish | G06F 21/10 455/411 |
| 2004/0128389 A1 * | 7/2004 | Kopchik | G06F 21/34 709/228 |
| 2004/0181672 A1 * | 9/2004 | Ferri | G06F 21/51 713/176 |
| 2007/0067373 A1 * | 3/2007 | Higgins | G06F 11/3013 |
| 2007/0078992 A1 | 4/2007 | Bloch et al. | |
| 2007/0240148 A1 | 10/2007 | Inada | |
| 2009/0075639 A1 * | 3/2009 | Bloebaum | H04M 1/72563 455/418 |
| 2009/0144718 A1 | 6/2009 | Boggs et al. | |
| 2009/0235352 A1 * | 9/2009 | Schrijen | G07F 7/1008 726/18 |
| 2010/0077392 A1 * | 3/2010 | Soh | G06Q 20/341 717/174 |
| 2010/0174974 A1 * | 7/2010 | Brisebois | G06F 17/243 715/223 |
| 2011/0010699 A1 | 1/2011 | Cooper et al. | |
| 2011/0093435 A1 | 4/2011 | Zha et al. | |
| 2011/0126183 A1 * | 5/2011 | Bernard | G06F 8/65 717/168 |
| 2011/0179268 A1 * | 7/2011 | Strom | G06F 21/121 713/156 |
| 2012/0072979 A1 | 3/2012 | Cha et al. | |
| 2012/0144383 A1 | 6/2012 | Mishra et al. | |
| 2012/0216007 A1 | 8/2012 | Tsirkin | |
| 2013/0024383 A1 | 1/2013 | Kannappan | |
| 2013/0067451 A1 * | 3/2013 | Hussain | G06F 8/61 717/172 |
| 2013/0212407 A1 * | 8/2013 | Walton | G06F 21/72 713/190 |
| 2013/0326500 A1 * | 12/2013 | Park | G06F 9/445 717/177 |
| 2013/0347064 A1 * | 12/2013 | Aissi | G06F 21/30 726/2 |
| 2014/0019367 A1 | 1/2014 | Khan et al. | |
| 2014/0019955 A1 | 1/2014 | Summerer | |
| 2014/0025940 A1 * | 1/2014 | Giraud | G06F 21/51 713/2 |
| 2014/0031024 A1 * | 1/2014 | Xie | G06F 21/57 455/418 |
| 2014/0108263 A1 | 4/2014 | Ortiz et al. | |
| 2014/0149746 A1 | 5/2014 | Yau | |
| 2014/0217972 A1 | 8/2014 | Swaminathan et al. | |
| 2015/0193222 A1 * | 7/2015 | Pirzadeh | G06F 8/65 717/168 |

FOREIGN PATENT DOCUMENTS

| | | |
|---|---|---|
| WO | WO 2006/061754 | 6/2006 |
| WO | WO 2007/014314 | 2/2007 |

OTHER PUBLICATIONS

Roland et al., "Applying Relay Attacks to Google Wallet", 2013.*
European Search Report and opinion directed to related European Patent Application No. EP 150181632, dated Jan. 14, 2016; 7 pages.

* cited by examiner

AUTOMATIC PURPOSED-APPLICATION CREATION

CROSS REFERENCE TO RELATED APPLICATION

This application claims priority under 35 U.S.C. § 119(e) to: U.S. Provisional Application Ser. No. 62/171,503, entitled "Automatic Applet Creation," by Kyle A. Diebolt and Mehdi Ziat, filed on Jun. 5, 2015; and to U.S. Provisional Application Ser. No. 62/040,941, entitled "Automatic Applet Creation," by Kyle A. Diebolt and Mehdi Ziat, filed on Aug. 22, 2014, the contents of both of which are herein incorporated by reference.

This application is related to U.S. Non-Provisional application Ser. No. 14/466,850, entitled "On-Board Applet Migration," by Ahmer A. Khan, Joakim Linde and Mehdi Ziat, filed on Aug. 22, 2014, the contents of which are herein incorporated by reference.

BACKGROUND

Field

The described embodiments relate generally to wireless electronic devices, including techniques for creating or installing a purposed application on a wireless electronic device.

Related Art

Many modern electronic devices typically include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface).

Presently, interest is increasing in using such electronic devices to conduct financial transactions. To facilitate this functionality, an electronic device may include a secure element to provide: security, confidentiality, and one or more application environments. The secure element may include one or more applets or applications (such as a payment applet associated with a credit card) that execute in an environment of the secure element, where the applets allow the secure element to conduct a financial transaction with another electronic device, such as a point-of-sale terminal.

Hence, there is a need for a scalable and secure technique to update applets installed on electronic devices.

SUMMARY

The described embodiments relate to an electronic device (such as a cellular telephone) that includes: an antenna; an interface circuit that wirelessly communicates with an installing device (which provides updates to the electronic device); and a secure element. During operation, the secure element receives, from the installing device, an installation package with a digital signature, where the installation package includes a purposed application to install on the secure element. Then, the secure element verifies the digital signature using an encryption key associated with a vendor of the secure element. Next, the secure element optionally exports user data associated with another purposed application installed on the secure element. Furthermore, the secure element installs the purposed application, and optionally personalizes the purposed application using the user data.

In some embodiments, prior to installing the purposed application, the secure element decrypts the installation package using a second encryption key associated with the vendor. This second encryption key may be the same as or different from the encryption key.

Moreover, the digital signature may be associated with a private encryption key of the vendor, and the secure element may verify the digital signature using a corresponding public encryption key of the vendor. However, in other embodiments symmetric encryption keys are used. Thus, the digital signature may be associated with the encryption key of the vendor, and the secure element may verify the digital signature using the encryption key of the vendor.

Furthermore, the receiving, verifying, installing and/or personalizing operations may be performed by an installation operating system that is executed by the processor in the secure element, and the installation operating system may be separate from the normal operating system, executed by the processor, which performs other functions of the secure element.

Additionally, the installation package may include multiple purposed applications, and a single cryptographic operation may be used to verify the digital signature for the multiple purposed applications.

In some embodiments, the secure element includes the processor, and memory, coupled to the processor, which stores a program module executed by the processor. The program module may include instructions for at least some of the aforementioned operations performed by the secure element.

Another embodiment provides the secure element.

Another embodiment provides a computer-program product for use in conjunction with the secure element in the electronic device. This computer-program product may include instructions for at least some of the aforementioned operations performed by the secure element.

Another embodiment provides a method for installing the purposed application on the secure element in the electronic device, which may be performed by the processor in the secure element. During operation, the processor receives, from the installing device, the installation package with the digital signature, where the installation package includes the purposed application to install on the secure element. Then, the processor verifies the digital signature using the encryption key associated with the vendor of the secure element. Next, the processor optionally exports the user data associated with another purposed application installed on the secure element. Furthermore, the processor installs the purposed application, and optionally personalizes the purposed application using the user data.

Another embodiment provides a system that includes the electronic device and the installing device.

The preceding summary is provided for purposes of summarizing some exemplary embodiments to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
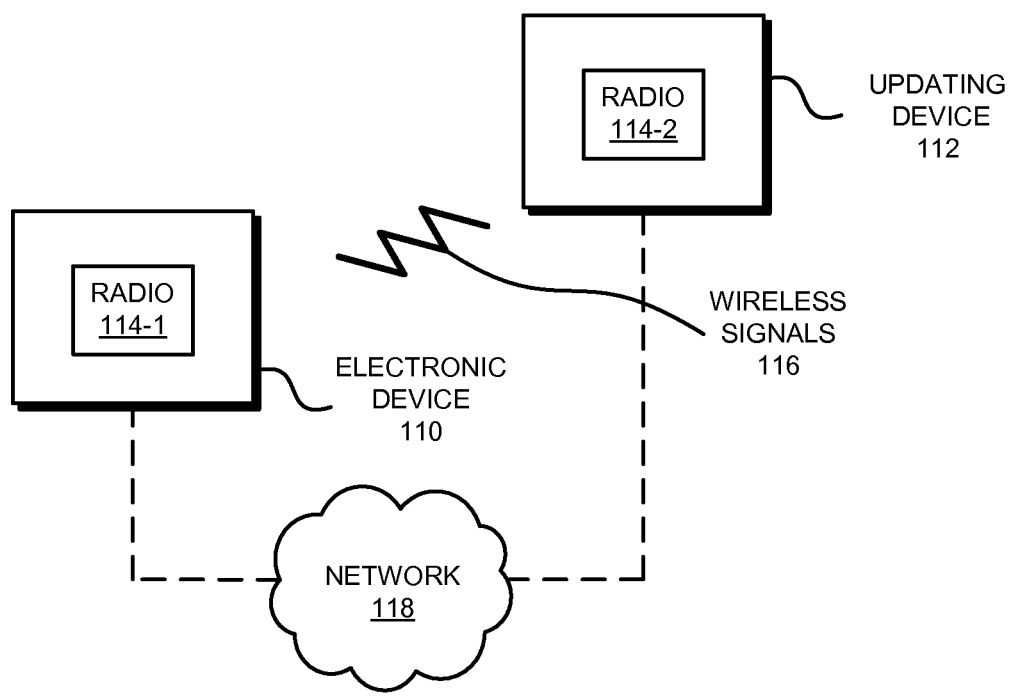
FIG. 1 is a block diagram illustrating electronic devices communicating in accordance with an embodiment of the present disclosure.

An electronic device (such as a cellular telephone) automatically installs and optionally personalizes a purposed application (which is sometimes referred to as an 'applet') on a secure element in the electronic device (which is sometimes referred to as 'applet creation'). In particular, when a digitally signed installation package containing the applet is received from an installing device (such as a server), the secure element may optionally verify the digital signature of the installation package using an encryption key associated with a vendor of the secure element. (However, in other embodiments the encryption key is associated with a provider of the electronic device and/or a certification authority.) Then, the secure element installs the applet. In addition, the secure element may optionally export user data from another applet installed on the secure element. Moreover, the secure element may personalize the installed applet using the user data from the other applet. In this way, the electronic device provides a scalable installation solution while allowing personalization from the other applet.

This update technique may provide secure updating of the purposed application while securely preserving previous user data. In addition, the update technique may be performed in a distributed manner on multiple electronic devices, which may prevent a centralized installation server from becoming a bottleneck.

In the discussion that follows, a purposed application (which is sometimes referred to as an 'application', 'small application' or an 'applet') should be understood to include a small application that performs one or more specific tasks, functions or purposes and that runs within the scope of a dedicated engine or a larger program or application (which are sometimes collectively referred to as a 'platform environment'). For example, the purposed application may run as a 'plug-in,' which is a software component that adds one or more specific features to an existing software application. Note that a purposed application executes on the platform environment of a system. The purposed application may be written in an interpreted or a compiled language.

The installation package or an update package may be received via wireless communication between the electronic device and the updating device. This wireless communication may involve conveying packets that are transmitted and received by radios in the electronic device and the updating device in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface, such as a near-field-communication standard or specification (from the NFC Forum of Wakefield, Mass.). In addition, the communication protocol may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In the discussion that follows, a cellular-telephone communication technique is used as an illustrative example.

The communication between the electronic device and the updating device is shown in FIG. 1, which presents a block diagram illustrating electronic device 110 and updating device 112 (which is sometimes referred to as 'installing device') communicating. As described further below with reference to FIGS. 3-7, these electronic devices may communicate when updating device 112 (such as a server or an update computer) provides an update package with an update to a previous version of an applet (i.e., a new version of the applet) that is installed on electronic device 110 (such as a cellular telephone). For example, the previous version of the applet may be installed on a secure element in electronic device 110. In addition, a user of electronic device 110 may have previously customized or personalized the previous version with user data. Alternatively or additionally, updating device 112 may provide an installation package with an applet to install on electronic device 110.

In the update technique described below, the secure element determines if the update package is relevant for electronic device 110 by identifying at least one (and, in some embodiments, all) previously installed versions (or alternatively, instances) of the applet. Then, the secure element authenticates the update package by verifying a digital signature, which is associated with a vendor of the secure element. (Alternatively, the digital signature may be associated with a provider of electronic device 110 or an applet installed on a secure element in electronic device 110.) For example, the secure element may use an encryption key associated with the vendor (such as a public encryption key) to verify the update package. In addition, the secure element may decrypt the update package using a second encryption key, which may be the same or different from the encryption key. In an exemplary embodiment, a public-private encryption-key technique is used. In particular, the update package may be signed using the private encryption key of the vendor, and the digital signature may be verified and the update package may be decrypted using the public encryption key of the vendor. However, in other embodiments a symmetric encryption technique is used. Thus, the same encryption key may be used to sign, encrypt and/or decrypt the update package.

Then, the secure element uninstalls the at least one (and, in some embodiments, all) previous versions of the applet and exports the associated user data. Next, the secure element installs the update to the applet, and personalizes the new version of the applet using the user data.

In these ways, electronic device 110 and updating device 112 may be used to securely and flexibly disseminate and install personalized updates to one or more applets previously installed on electronic device 110, while migrating or keeping the associated user data.

Similarly, in the installation technique described below, the secure element authenticates the installation package by verifying a digital signature, which is associated with a vendor of the secure element. (Alternatively, the digital signature may be associated with a provider of electronic device 110 or an applet installed on a secure element in electronic device 110.) For example, the secure element may use an encryption key associated with the vendor (such as a public encryption key) to verify the installation package. In addition, the secure element may decrypt the installation package using a second encryption key, which may be the same or different from the encryption key. In an exemplary embodiment, a public-private encryption-key technique is used. In particular, the installation package may be signed using the private encryption key of the vendor, and the digital signature may be verified and the installation package may be decrypted using the public encryption key of the vendor. However, in other embodiments a symmetric encryption technique is used. Thus, the same encryption key may be used to sign, encrypt and/or decrypt the installation package.

Then, the secure element optionally exports user data associated with the other applet installed on the secure element. Next, the secure element installs the applet, and optionally personalizes the applet using the user data.

In these ways, electronic device 110 and updating device 112 may be used to securely and flexibly disseminate and install an applet on electronic device 110, while optionally migrating user data associated with the other applet (and, thus, optionally personalizing the applet).

As noted previously, the communication between electronic device 110 and/or updating device 112 may involve the exchange of packets that include the update package or the installation package. These packets may be included in frames in one or more wireless channels.

As described further below with reference to FIG. 2, electronic device 110 and/or updating device 112 may include subsystems, such as: a networking subsystem, a memory subsystem, a processing subsystem and a secure subsystem. In addition, electronic device 110 and/or updating device 112 may include radios 114 in the networking subsystems. More generally, electronic device 110 and/or updating device 112 can include (or can be included within) any electronic devices with networking subsystems that enable electronic device 110 and/or updating device 112 to wirelessly communicate with another electronic device. This can comprise transmitting frames on wireless channels to enable electronic devices to make initial contact, followed by exchanging subsequent data/management frames (such as connect requests to establish a connection), configuring security options (e.g., IPSEC), transmitting and receiving packets or frames, etc.

As can be seen in FIG. 1, wireless signals 116 (represented by a jagged line) are transmitted from/received by a radio 114-1 in electronic device 110. These wireless signals are received by/transmitted from radio 114-2 in updating device 112. (Note that the communication between electronic device 110 and/or updating device 112 may also occur via network 118, which may involve wired communication with a different communication protocol than wireless signals 116.) Moreover, the wireless communication may or may not involve a connection being established between electronic device 110 and/or updating device 112, and therefore may or may not involve communication via a wireless network (such as a cellular-telephone network).

In the described embodiments, processing a packet or frame in electronic device 110 and/or updating device 112 includes: receiving wireless signals 116 with the packet or frame; decoding/extracting the packet or frame from received wireless signals 116 to acquire the packet or frame; and processing the packet or frame to determine information contained in the packet or frame (such as at least a portion of the update package).

As noted previously, in general communication between electronic device 110 and/or updating device 112 may be encrypted. This encryption may use an encryption key (such as an encryption key associated with the applet and/or the vendor of the secure element). Furthermore, the encryption may use symmetric or asymmetric encryption techniques.

Although we describe the environment shown in FIG. 1 as an example, in alternative embodiments, different numbers or types of electronic devices may be present. For example, some embodiments comprise more or fewer electronic devices. As another example, in another embodiment, different electronic devices transmit and/or receive packets or frames.

We now describe embodiments of the electronic device. FIG. 2 presents a block diagram illustrating electronic device 110. This electronic device includes processing subsystem 210, memory subsystem 212, networking subsystem 214, authentication subsystem 216 and secure subsystem 218. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include a secure enclave processor 220 (which is a system-on-chip within one or more processors in processing subsystem 210) that performs security services for other components in the processing subsystem 210 and that securely communicates with other subsystems in electronic device 110. Secure enclave processor 220 may include one or more processors, a secure boot ROM, one or more security peripherals, and/or other components. The security peripherals may be hardware-configured to assist in the secure services performed by secure enclave processor 220. For example, the security peripherals may include: authentication hardware implementing various authentication techniques, encryption hardware configured to perform encryption, secure-interface controllers configured to communicate over the secure interface to other components, and/or other components. In some embodiments, instructions executable by secure enclave processor 220 are stored in a trust zone in memory subsystem 212 that is assigned to secure enclave processor 220, and secure enclave processor 220 fetches the instructions from the trust zone for execution. Secure enclave processor 220 may be isolated from the rest of processing subsystem 210 except for a carefully controlled interface, thus forming a secure enclave for secure enclave processor 220 and its components. Because the interface to secure enclave processor 220 is carefully controlled, direct access to components within secure enclave processor 220 (such as a processor or a secure boot ROM) may be prevented. In some embodiments, secure enclave processor 220 encrypts and/or decrypts authentication information communicated with authentication subsystem 216, and encrypts and/or decrypts information (such as tokens) communicated with secure subsystem 218. Furthermore, secure enclave processor 220 may compare authentication information with stored authentication and, if a match is obtained, may provide an encrypted token with an authentication-complete indicator to a secure element 230 and/or may assert the authentication-complete indicator as a flag in operating system 244.

Memory subsystem 212 includes one or more devices for storing data and/or instructions for processing subsystem 210, networking subsystem 214, authentication subsystem 216 and/or secure subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 246, e.g., a digital wallet, a passbook and/or a mobile payments application), which may be executed by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 110. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 110 as fast-access storage for often-used data, while the mass-storage device is used to store less frequently used data.

Networking subsystem 214 includes one or more devices configured to couple to and communicate on a wired and/or wireless network (i.e., to perform network operations), including an interface circuit 222 (such as a near-field-communication circuit) and an antenna 224. For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another communication system (such as a near-field-communication system).

Networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 110 may use the mechanisms in networking subsystem 214 for performing simple wireless communication between electronic device 110 and updating device 112 (FIG. 1), e.g., transmitting advertising frames and/or near-field communication.

Authentication subsystem 216 may include one or more processors, controllers and devices for receiving the authentication information from a user of electronic device 110, and for securely communicating this authentication information to processing subsystem 210 (such as by encrypting the authentication information). For example, the authentication information may include: a biometric identifier acquired by a biometric sensor 226 (such as: a fingerprint sensor, a retinal sensor, a palm sensor, a digital signature-identification sensor, etc.); a personal identification number (PIN) associated with one of payment applets 236 that is received using a user-interface device 228 (such as a keypad, a touch-sensitive display, optical character recognition and/or voice recognition); and a passcode for unlocking at least some functionality of electronic device 110 that is received using user-interface device 228.

Furthermore, secure subsystem 218 may include a secure element 230, which includes one or more processors and memory. Note that secure element 230 may be a tamper-resistant component that is used in electronic device 110 to provide the security, confidentiality, and multiple application environments required to support various business models. Secure element 230 may exist in one or more of a variety of form factors, such as: a universal integrated circuit card (UICC), an embedded secure element (on a circuit board in electronic device 110), a smart secure digital (SD) card, a smart microSD card, etc.

Moreover, secure element 230 may include one or more applets or applications that execute in an environment of secure element 230 (such as in operating system 232 of secure element 230, and/or in a Java runtime environment executing on the secure element 230). For example, the one or more applets may include an authentication applet that: performs contactless registry services, encrypts/decrypts packets or tokens communicated with secure enclave processor 220, sets one or more software flags (such as an authentication-complete flag) in operating system 232 of secure element 230, and/or conveys information to one or more payment applets 236. The one or more applets may include one or more payment applets 236 that conduct financial transactions with another electronic device when they are activated by program module 246, and based on the one or more software flags and/or when electronic device 110 is proximate to the other electronic device. In particular, payment applets 236 may each be associated with a financial vehicle (such as a credit card, a debit card, a prepaid debit card, a gift card and, more generally, a financial vehicle provided by a financial institution, e.g., a bank, that is associated with a financial account of a user, such as a user of electronic device 110). In addition, secure element 230 may include information associated with the one or more payment applets 236 (such as a financial credential, e.g., a device primary account number or DPAN, a PIN, e.g., a debit-card number, which is associated with a given payment applet, and one or more encryption keys that are associated with the given payment applet) that is used when conducting the financial transactions. (Note that the DPAN may be associated with, but different than, a financial primary account number or FPAN for the financial account, such as a credit-card number. The DPAN may be a virtual identifier for the financial account.)

The authentication applet may execute in a master or issuer security domain in secure element 230 (such as controlling authority security domain), while payment applets 236 may execute in supplemental security domains. Communication between these security domains may be encrypted using different encryption/decryption keys that are security-domain specific. In electronic device 110 and/or during communication between electronic device 110 and/or updating device 112 (FIG. 1), encryption/decryption may involve symmetric and/or asymmetric encryption. In addition, the information communicated may also include a digital signature that is specific to electronic device 110 and/or components in electronic device 110, such as secure element 230 or one of payment applets 236.

During operation of electronic device 110, the user may use passbook 248 to select or activate one or more of payment applets 236. If the payment applet supports an authentication-complete flag (as indicated by the enabling or setting of authentication support in the payment applet), in order for the payment applet to conduct a financial transaction with another electronic device, the payment applet may need to be activated and the authentication-complete flag may need to be set or enabled in secure element 230 (indicating that the user has been authenticated). In contrast, for one of payment applets 236 that does not support the authentication-complete flag, a financial transaction may be conducted when this payment applet is active (i.e., operation of the payment applet is not gated by the setting or enabling of the authentication-complete flag in secure element 230). While the present discussion illustrates the use of a global authentication-complete flag, note that in some embodiments separate authentication-complete flags are associated with at least some of payment applets 236 (i.e., there may be a specific authentication-complete flag for a given payment applet, etc.).

When electronic device 110 is proximate to the other electronic device (such as a point-of-sale terminal) or when secure enclave processor 220 provides a payment command to secure element 230, one of the specified, activated and/or authenticated payment applets 236 may provide a payment packet (which may be encrypted or unencrypted) to interface circuit 222 or to secure enclave processor 220 (which then provides the payment packet to interface circuit 222). Then, interface circuit 222 may communicate the payment packet to the other electronic device (such as a point-of-sale terminal) using antenna 224. Note that the payment packet may include financial information (such as a financial credential or a DPAN associated with the one of the payment applets 236).

This financial information (as well as additional information provided by the other electronic device, such as a merchant identifier, an amount of the financial transaction, etc.) may be communicated by the other electronic device to a payment network 118 (FIG. 1) to complete a financial transaction. Once the financial transaction is complete, a notification from a management electronic device (which may be associated with a provider of electronic device 110) may be received by interface circuit 222. Passbook 248 may provide the notification to display subsystem 240 for display, so the user of electronic device 110 can be alerted that the financial transaction was successfully completed.

As noted previously, during the update technique electronic device 110 may receive the digitally signed update package from updating device 112 (FIG. 1). In particular, interface circuit 222 may receive the update package, and may provide the update package to secure enclave processor 220. Then, secure enclave processor 220 may securely communicate the update package to secure element 230. In response, operating system 232 (or a program module executed by a processor in secure element 230 in an environment of operating system 232) may identify at least one previous version of one of applets 236 (such as a payment applet), which is installed on secure element 230. For example, the at least one previous version of one of applets 236 may be identified by searching a registry associated with operating system 232.

Moreover, operating system 232 may optionally verify the digital signature using an encryption key associated with a vendor of secure element 230 (or a vendor of the applet). However, in other embodiments the encryption key is associated with a provider of the electronic device and/or a certification authority.

In some embodiments, operating system 232 decrypts the update package using a second encryption key associated with the vendor of secure element 230 (or the vendor of the applet). This second encryption key may be the same as or different from the encryption key.

Next, operating system 232 may uninstall the at least one previous version of the applet, and may export user data associated with the at least one previous version of the applet. Furthermore, operating system 232 may install the update to the applet, and may personalize the applet using the user data. The uninstalling (or deleting), exporting, installing and personalizing of the applet may occur within a security domain on secure element 230.

Note that one or more of the aforementioned operations performed by operating system 232 may be performed by an updating operating system 234 (such as a high-end boot loader) that is executed by the processor in the secure element. This updating operating system may be separate from operating system 232, which performs other functions of secure element 230. Updating operating system 234 may update portions of operating system 232 and/or software associated with one or more of applets 236.

Similarly, as noted previously, during the installation technique electronic device 110 may receive the digitally signed installation package from updating device 112 (FIG. 1). In particular, interface circuit 222 may receive the installation package, and may provide the installation package to secure enclave processor 220. Then, secure enclave processor 220 may securely communicate the installation package to secure element 230. In response, operating system 232 (or a program module executed by a processor in secure element 230 in an environment of operating system 232) may optionally verify the digital signature using an encryption key associated with a vendor of secure element 230 (or a vendor of the applet). However, in other embodiments the encryption key is associated with a provider of the electronic device and/or a certification authority.

In some embodiments, operating system 232 decrypts the installation package using the second encryption key associated with the vendor of secure element 230 (or the vendor of the applet). This second encryption key may be the same as or different from the encryption key.

Next, operating system 232 may optionally export user data associated with another applet installed on secure element 230. Furthermore, operating system 232 may install the applet, and may optionally personalize the applet using the user data. The exporting, installing and personalizing of the applet may occur within a security domain on secure element 230.

Note that one or more of the aforementioned operations performed by operating system 232 may be performed by an updating operating system 234 (which is sometimes referred to as an 'installation operating system'), such as a high-end boot loader, that is executed by the processor in the secure element. This updating operating system may be separate from operating system 232, which performs other functions of secure element 230. Updating operating system 234 may update portions of operating system 232 and/or may install software associated with one or more of applets 236.

Within electronic device 110, processing subsystem 210, memory subsystem 212, networking subsystem 214, authentication subsystem 216 and secure subsystem 218 may be coupled using one or more interconnects, such as bus 238. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, electronic device 110 can detect tampering with secure components (such as secure enclave processor 220, secure element 230 and/or bus 238) and may destroy encryption/decryption keys or authentication information (such as a stored biometric identifier) if tampering is detected.

In some embodiments, electronic device 110 includes display subsystem 240 for displaying information on a display (such as a notification of a successfully completed financial transaction), which may include a display driver and the display, such as a liquid-crystal display, a multi-touch touchscreen, etc. In addition, in some embodiments electronic device 110 includes a secure input/output (I/O) subsystem 242 (such as a keypad) for receiving the PIN of the user that is associated with one of payment applets 236. As noted previously, display subsystem 240 and/or secure I/O subsystem 242 may be included in authentication subsystem 216.

Electronic device 110 can be (or can be included in) any electronic device with at least one network interface. For example, electronic device 110 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include, but is not limited to, a data collection subsystem, an audio and/or video subsystem, an alarm subsystem, and/or a media processing subsystem. Also, although separate subsystems are shown in FIG. 2, in some embodiments, some or all of a given subsystem or component can be integrated into one or more of the other subsystems or components in electronic device 110. For example, in some embodiments program module 246 is included in operating system 244. Alternatively or additionally, at least some of the functionality of program module 246 may be included in passbook 248.

Moreover, the circuits and components in electronic device 110 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of electronic device 110. Moreover, the integrated circuit may include hardware and/or software mechanisms that are used for transmitting wireless signals from electronic device 110 to, and receiving signals at electronic device 110 from updating device 112 (FIG. 1). Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with a cellular-telephone network was used as an illustrative example, the described embodiments of the update technique may be used in a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

While the preceding discussion focused on the hardware, software and functionality in electronic device 110, updating device 112 (FIG. 1) may have the same or similar hardware (processors, memory, networking interfaces, etc.) and/or software to support the operations performed by these entities, as described further below with reference to FIGS. 3-7 and 10-11. In particular, these entities may include one or more computer systems with a processing subsystem that executes one or more program modules stored in a memory subsystem to perform the operations, and one or more networking interfaces for communicating with other electronic devices, such as electronic device 110.

Figure 3:
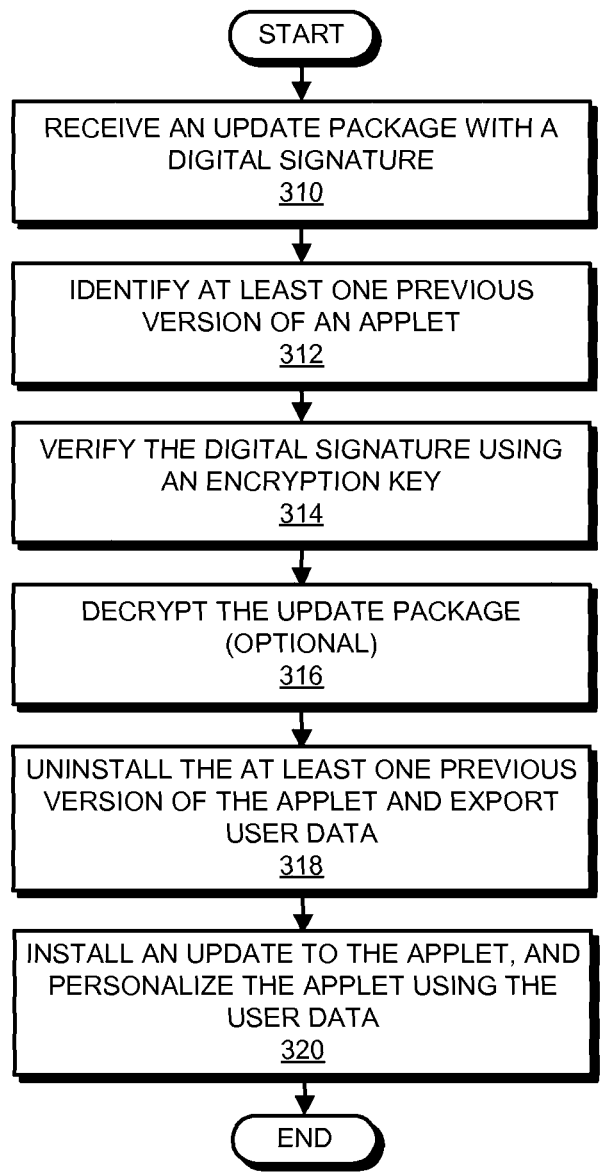
FIG. 3 is a flow diagram illustrating a method for updating an applet installed on one of the electronic devices in FIG. 1 in accordance with an embodiment of the present disclosure.

We now further describe updating or migrating the applet installed on the secure element in the electronic device. FIG. 3 presents a flow diagram illustrating a method 300 for updating an applet installed on an electronic device (such as electronic device 110 in FIG. 1), which may be performed by a processor in a secure element in the electronic device. For example, the processor may execute a program module that includes instructions for operations in method 300. During operation, the processor receives, from an updating device, an update package with a digital signature (operation 310), where the update package includes an update to the applet installed on the secure element.

Then, the processor identifies at least one previous version of the applet (operation 312) installed on the secure element. For example, the secure element may identify two or more versions of the applet previously installed on the secure element, and may uninstall the two or more previously installed versions of the applet. In some embodiments, the secure element identifies all the previously installed versions of the applet, and uninstalls all of the previously installed versions of the applet. Note that the at least one previous version of the applet may be identified by searching a registry associated with a normal operating system that is executed by a processor in the secure element.

Moreover, the processor verifies the digital signature using an encryption key (operation 314), which may be associated with a vendor of the secure element. In particular, the digital signature may be associated with a private encryption key of the vendor, and the secure element may verify the digital signature using a public encryption key of the vendor. However, in other embodiments symmetric encryption keys are used. Thus, in these embodiments the digital signature may be associated with the encryption key of the vendor, and the secure element may verify the digital signature using the encryption key of the vendor.

In some embodiments, the secure element optionally decrypts the update package (operation 316) using a second encryption key, which may be associated with the vendor. This second encryption key may be the same as or different from the encryption key.

Next, the processor uninstalls the at least one previous version of the applet, and exports user data (operation 318) associated with the at least one previous version of the applet.

Furthermore, the processor installs the update to the applet, and personalizes the applet using the user data (operation 320).

Note that one or more of the operations in method 300 may be performed by an updating operating system that is executed by the processor in the secure element, and the updating operating system may be separate from the normal operating system, executed by the processor, which performs other functions of the secure element. (Alternatively, one or more of the operations in method 300 may be performed by the normal operating system or by a program module executing in an environment associated with the normal operating system.) This approach is illustrated further below with reference to FIGS. 4 and 6.

Figure 2:
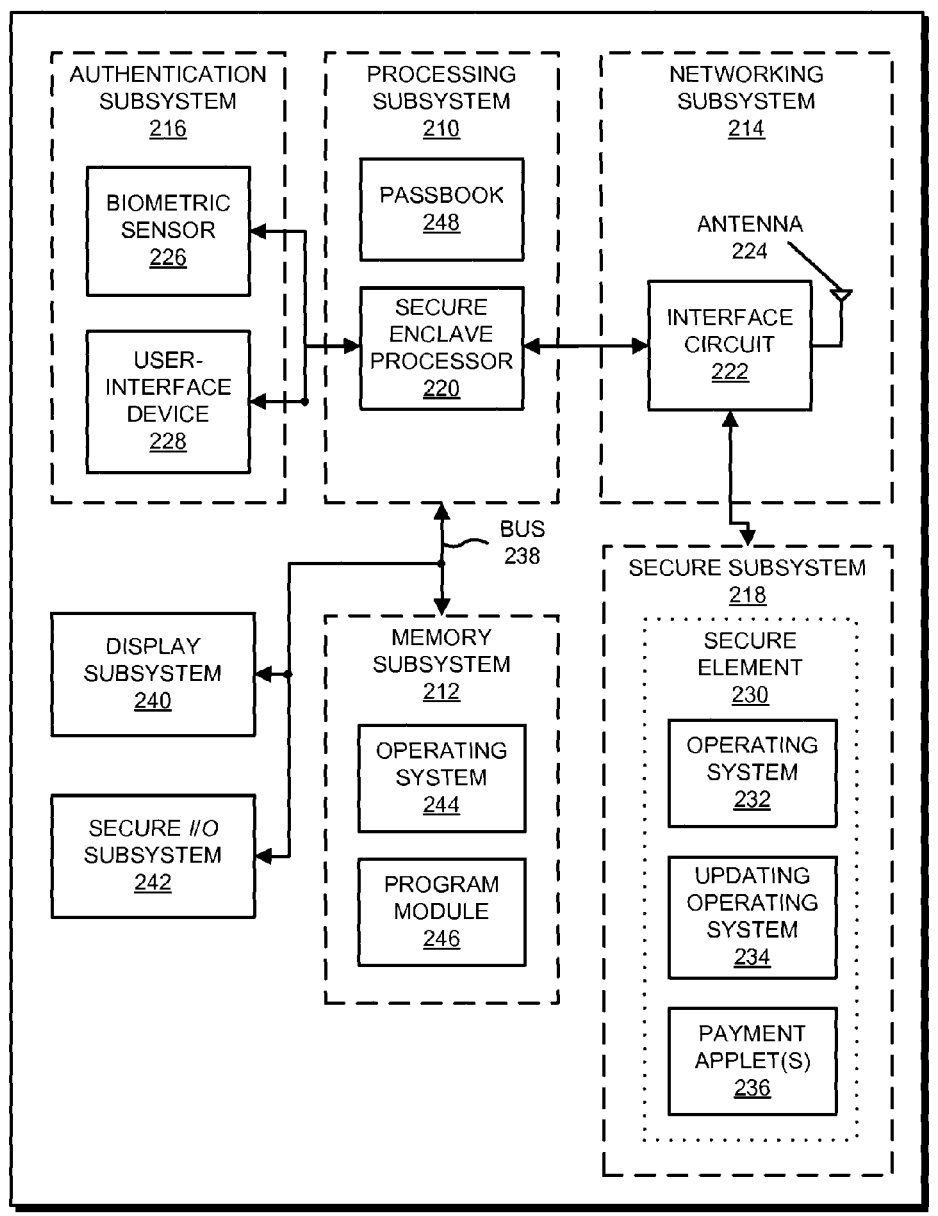
FIG. 2 is a block diagram illustrating one of the electronic devices of FIG. 1 in accordance with an embodiment of the present disclosure.

In an exemplary embodiment, the update technique allows updates to one or more Java Card applets on an electronic device that includes a secure element (such as secure element 230 in FIG. 2). In addition to instantiating or installing the new version (or, alternatively, the new instance) of the applet, the update technique may securely transfer of user data from the previous version(s) of the applet (e.g., the currently installed version) to the new version of the applet, and may uninstall (or delete) the previous version(s) of the applet. This update technique may address several problems and challenges associated with secure updates to Java Card applets installed on a secure element.

In particular, in existing update techniques a Java Card applet may be loaded onto the secure element in the form a binary (executable load file). An applet instance or version may be installed from these binaries and may be used to support a variety of use-cases. Note that an update package may include binaries for one or more applets having a common class application identifier, or class AID (thus, updates for applets having different class AIDs may be included in different update packages). Updates to the applet software typically involve loading the binary for a new version to the secure element, installing the new version of the applet and then personalizing the new version of the applet.

However, once the new binary is loaded onto the secure element, there may not be any information that the secure element can use to determine that the new binary is a new version of an existing binary and to proceed with the creation of new versions of the applets for each of the versions of the installed applets associated with the new binary. Consequently, in the existing update technique a new instance may need to be created for each instance or version currently installed on the secure element.

Furthermore, the applets may use user data that can be populated during a personalization phase and/or during its use. However, in the absence of an approach for securely transferring this data from one applet instance to another in the existing update techniques, a time-consuming re-personalization operation may be needed and/or the user data may be lost.

In addition, by requiring two versions of the same binary to be maintained along with twice the number of applet instances, the existing update techniques may constrain limited memory in the secure element.

In the disclosed update technique, a supplemental-security-domain data-store global service in the secure element (such as secure element 230 in FIG. 2) provides encryption key management and communication access to external entities (such as updating device 112 in FIG. 1). Moreover, security domains on the secure element may expose a global service to their associated applications, allowing them to import and export data to a secure data store managed by the supplemental security domain.

As described below with reference to FIGS. 4 and 5, when the electronic device receives an update package (which may include new operating-system code, a new package or binary with a different AID than the current package AID, and/or metadata), an on-board (or internal) deletion and data-export process may occur. Then, as described below with reference to FIGS. 6 and 7, an on-board installation and applet-personalization process may occur.

Moreover, during these processes one or more registry-entry objects in the normal operating system (such as operating system 232 in FIG. 2) may be augmented with a 'secondary AID' field. In particular, a registry entry for an instance or version of an applet may include: a package AID, a class AID, an AID, a secondary AID, an associated security domain, privileges, and a life-cycle state. The metadata section in the update package may include the package AID, as well as the package AIDs of the previous versions of the applet signed using the operating-system update private-verification encryption key.

After receiving the update package, the secure enclave processor (such as secure enclave processor 220 in FIG. 2) may extract the metadata and use it to construct an update-applets command (which is sometimes referred to as an 'update-applets application-protocol-data-unit command') that it sends to the secure element. Then, the secure element may receive the update-applets command sent to the master or issuer security domain.

Figure 4:
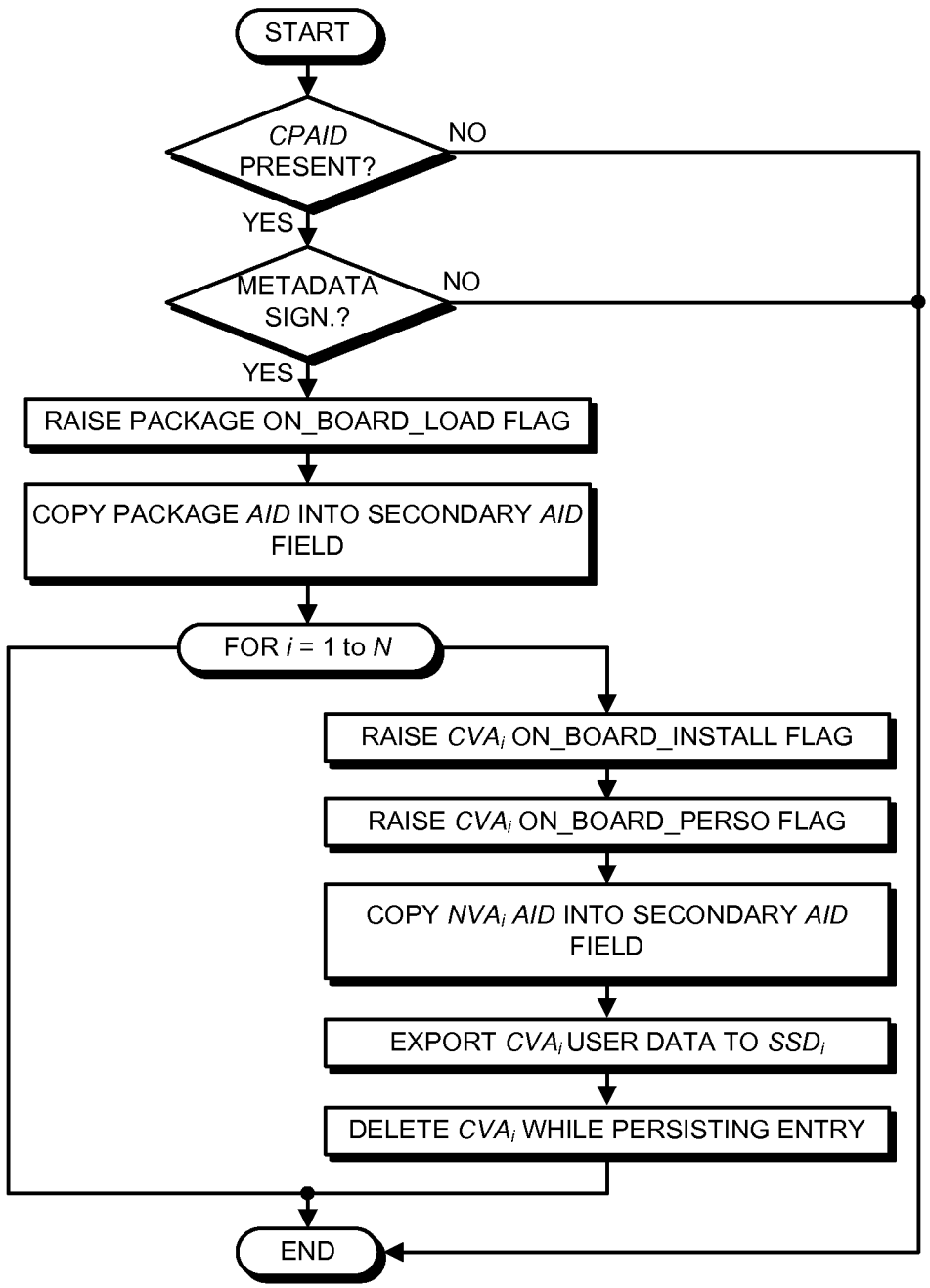
FIG. 4 is a flow diagram illustrating a method for uninstalling a version of an applet and exporting personal data in one of the electronic devices in FIG. 1 in accordance with an embodiment of the present disclosure.

As shown in FIG. 4, which presents a flow diagram illustrating a method 400 for uninstalling a version of an applet and exporting personal data in electronic device 110 (FIG. 1), in response to receiving the update-applets command the normal operating system in the secure element may browse the registry searching for the current package AID (CPAID). If a similar package AID is found, the normal operating system may proceed with the verification of the digital signature of the metadata. Moreover, if the signature verification is successful, the secure element may start the on-board deletion. The normal operating system may then raise an 'on_board_flag' in the registry entry of the package. This on_board_flag may be kept raised until the installation and personalization process described below is complete. In addition, the normal operating system may copy the current package AID into the secondary AID field of the package registry entry. Thus, the registry entry for a package may include the on_board_load flag and one more applet entries. Each of these applet entries for the package may include an associated on_board_install flag, as well as the package AID, the class AID, the AID, the secondary AID, the associated security domain, the privileges, and the life-cycle state.

Furthermore, the normal operating system may browse the registry for all applets instantiated from the package to be updated. For each applet (1 to N), the normal operating system may raise the following flags in the registry entry for the current version of the applet (CVA): 'on_board_install' (which may be kept raised until the corresponding applet from the update package has been installed) and 'on_board_perso' (which may be kept raised until the corresponding applet from the update package has been personalized using the migrated user data).

Additionally, the normal operating system may store the new version of the applet (NVA) AID provided in the update table in the update package in each corresponding registry entry. This AID may replace the current version of the applet AID once the on_board_install flag has been lowered. Note that for applet AIDs which are not included in the update table, the current version of the applet AID may be populated in the secondary AID field.

Moreover, note that each version or instance to be deleted (including the applets not present in the update table) may be triggered prior to its deletion and may export its user data to its associated supplemental security domain (SSD). As described previously, the supplemental security domain may implement a global service and expose the data-store interface. Upon receipt of a global-service request, the associated supplemental security domain may check that the applet requesting the global service is one of its associated applications based on the registry entry of the applet.

Once all current versions of the applets have been successfully deleted, the normal operating system in the secure element may block any subsequent application-protocol-data-unit messages (i.e., atomic messages between entities or components in the electronic device) except: a command selecting the issuer security domain; and another update-applets command. Thus, the normal operating system may reject other application-protocol-data-unit commands (e.g., with a particular status word).

Figure 5:
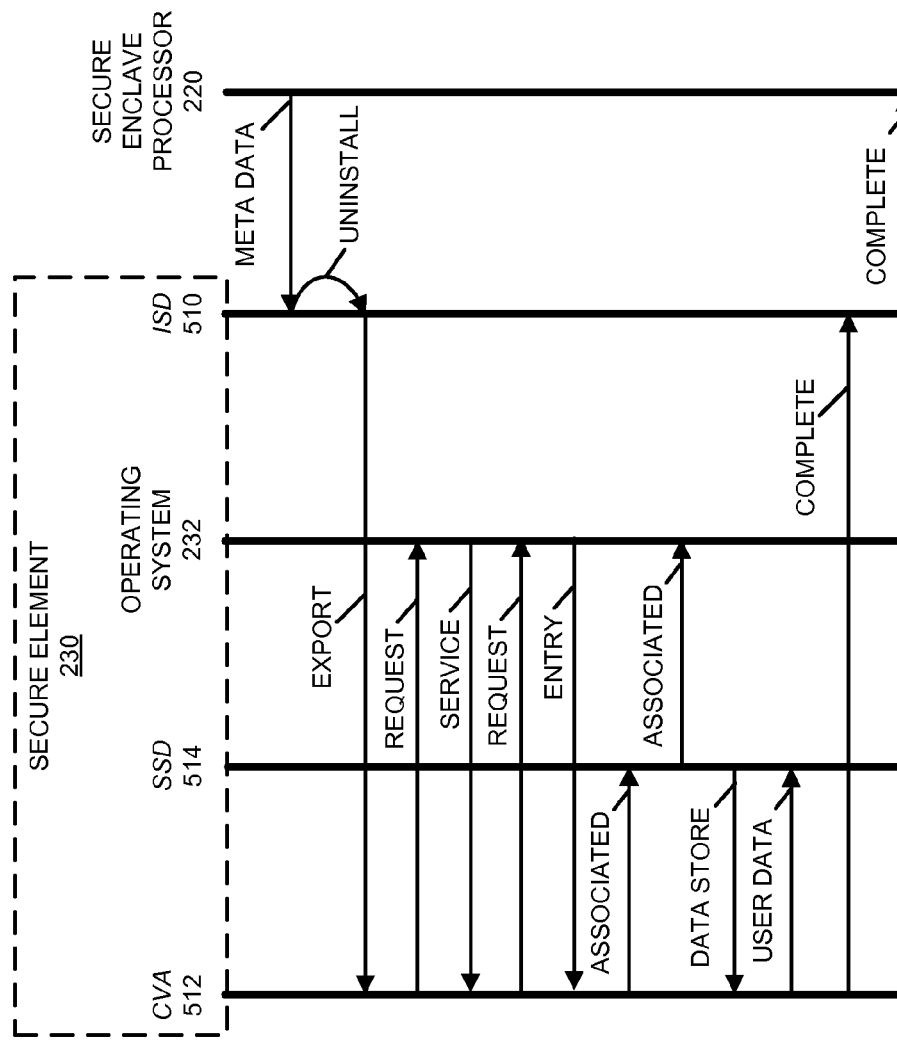
FIG. 5 is a drawing illustrating communication within one of the electronic devices in FIG. 1 in accordance with an embodiment of the present disclosure.

The communication within electronic device 110 during method 400 is shown in FIG. 5. In particular, secure enclave processor 220 (and, more generally, processing subsystem 210 in FIG. 2) may provide metadata from an update packet to issuer security domain (ISD) 510 in secure element 230. This is forwarded as an export command to a current version of the applet (CVA) 512, which requests the supplemental security domain for global service from operating system 232. After receiving information specifying supplemental security domain (SSD) 514, CVA 512 requests the registry-entry object or pointer from operating system 232.

Then, CVA 512 confirms it is associated with SSD 514, which in turn confirms the association with operating system 232. Next, SSD 514 provides a handle to the data store to CVA 512. In response, CVA 512 exports user data to SSD 514, and indicates that it is done to ISD 510, which in turn notifies secure enclave processor 220.

After the current versions of the applet instances or versions have been successfully deleted and their user data has been successfully exported to their associated security domain, the electronic device (such as the secure enclave processor) may trigger the secure element to boot in operating-system update mode (i.e., updating operating system 234 in FIG. 2 may be used). Then, the electronic device may send the operating-system update bundle to the secure element, which optionally updates its operating-system software in addition to storing the update packages in its memory. In addition, the updating operating system may populate the package AID field with the new package AID value. Note that the updating operating system and the normal operating system may exchange information via flags, such as the on_board_load flag.

Figure 6:
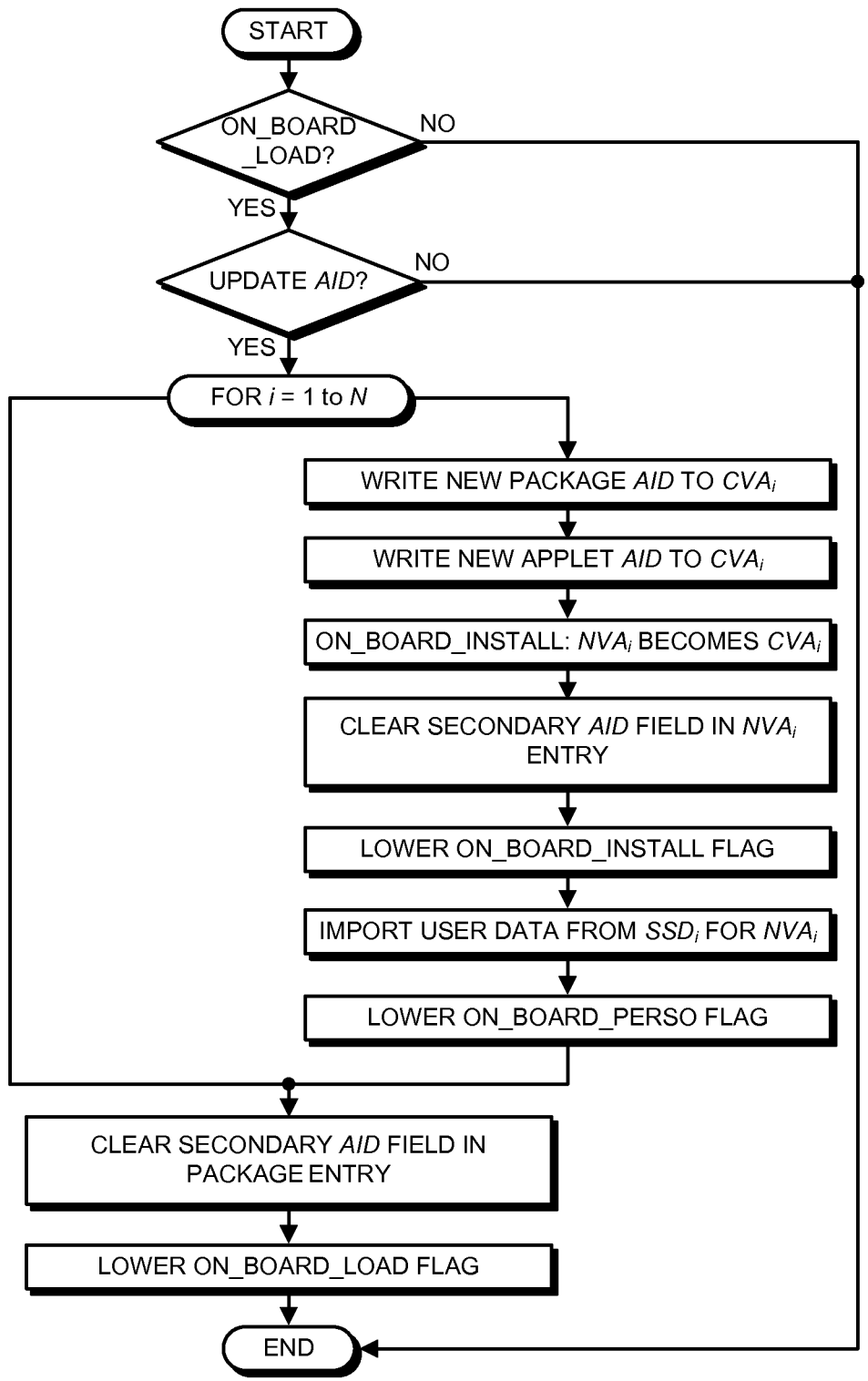
FIG. 6 is a flow diagram illustrating a method for installing a new version of an applet and importing personal data in one of the electronic devices in FIG. 1 in accordance with an embodiment of the present disclosure.

After the operating-system update, the electronic device may send an update-applets application-protocol-data-unit command to the issuer security domain. Then, as shown in FIG. 6, which presents a flow diagram illustrating a method 600 for installing a new version of an applet and importing personal data on electronic device 110 (FIG. 1), the normal operating system (such as operating system 232 in FIG. 2) may browse the registry for the package with on_board_load flag raised. If an update or new package has been uploaded, the update package AID may be present in the secondary AID field of the registry entry for the package. Otherwise, the current package AID may be present.

If an update package has been uploaded, the normal operating system may create a new instance or version for each applet (1 to N) having a registry entry flagged with the on_board_install flag. In particular, the normal operating system may first replace the current package AID field of the registry entry for the applet with the update or new package AID, and then may replace the AID field of the registry entry for the applet with the update or new version of the applet AID previously stored in the secondary AID field of the registry entry for the applet.

Alternatively, if no update or new package has been uploaded, the normal operating system may re-create all the instances or versions deleted during the on-board delete.

If the installation is successful, the normal operating system may lower the on_board_install flag and the normal operating system may clear the secondary AID field of the registry entry for the applet. Note that each update or new version of the applet may be triggered during its installation and may import its data from its associated security domain.

Moreover, if the user data has been successfully imported (i.e., the installed new version of the applet has been personalized), the normal operating system may lower the on_board_perso flag in the registry entry for the applet.

The installation of the update or new versions of the applets may take place within the context of the update-applets application-protocol-data-unit command. If an error is reported by the secure element, the electronic device may send another update-applets application-protocol-data-unit command.

Note that the normal operating system in the secure element may enforce a rule that only one successful update-applets application-protocol-data-unit command can be processed after the operating-system update takes place. However, the electronic device can send multiple update-applets application-protocol-data-unit commands until it receives a completion response from the issuer security domain.

After all applet instances or versions have been created and re-personalized, the normal operating system in the secure element may lower the on_board_load flag from the registry entry for the package and may clear the secondary AID field.

Figure 7:
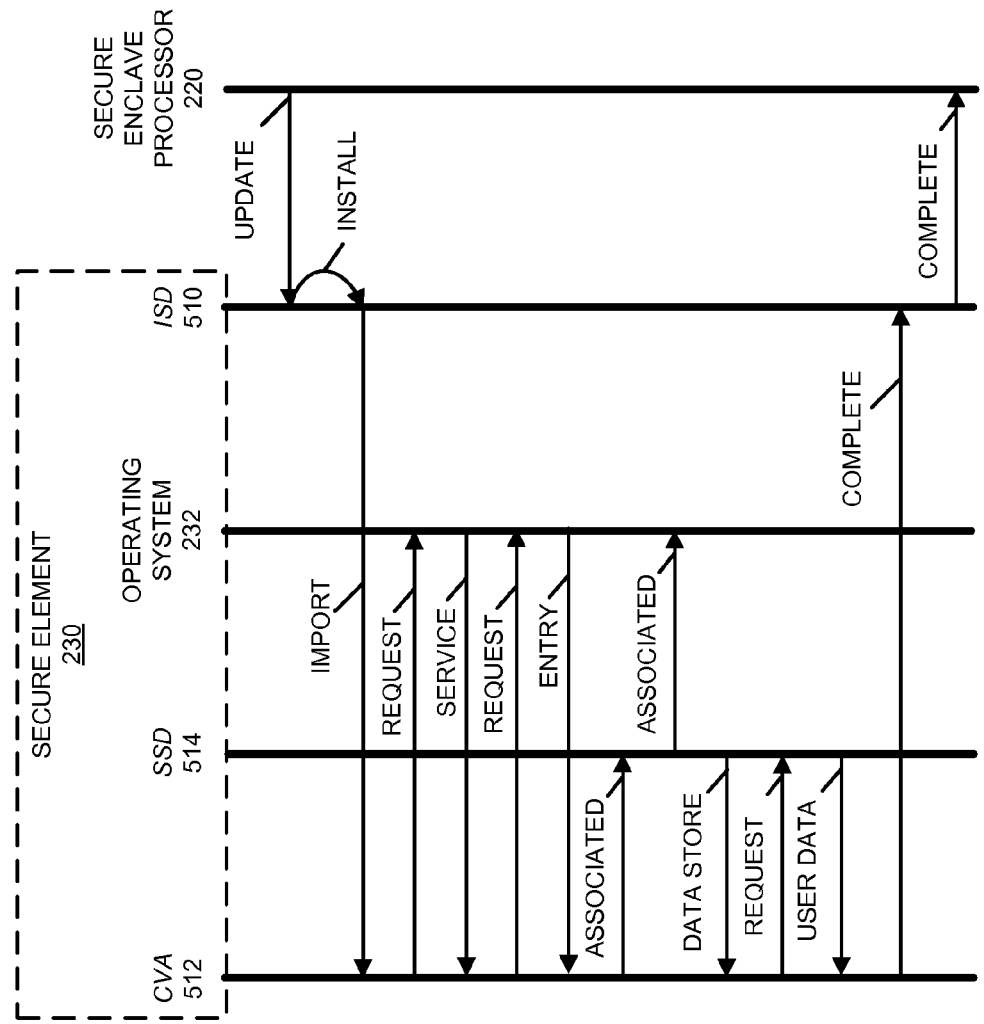
FIG. 7 is a drawing illustrating communication within one of the electronic devices in FIG. 1 in accordance with an embodiment of the present disclosure.

The communication within electronic device 110 during method 600 is shown in FIG. 7. In particular, secure enclave processor 220 (and, more generally, processing subsystem 210 in FIG. 2) may provide an update command to issuer security domain (ISD) 510 in secure element 230. This is forwarded as an import command to an update or new version of the applet (NVA), which requests the supplemental security domain for global service from operating system 232. After receiving information specifying (SSD) 514, NVA 710 requests the registry-entry object or pointer from operating system 232.

Then, NVA 710 confirms that it is associated with SSD 514, which in turn confirms the association with operating system 232. Next, SSD 514 provides a handle to the data store to NVA 710. In response, NVA 710 imports user data from SSD 514, and indicates that it is done to ISD 510, which in turn notifies secure enclave processor 220.

Figure 8:
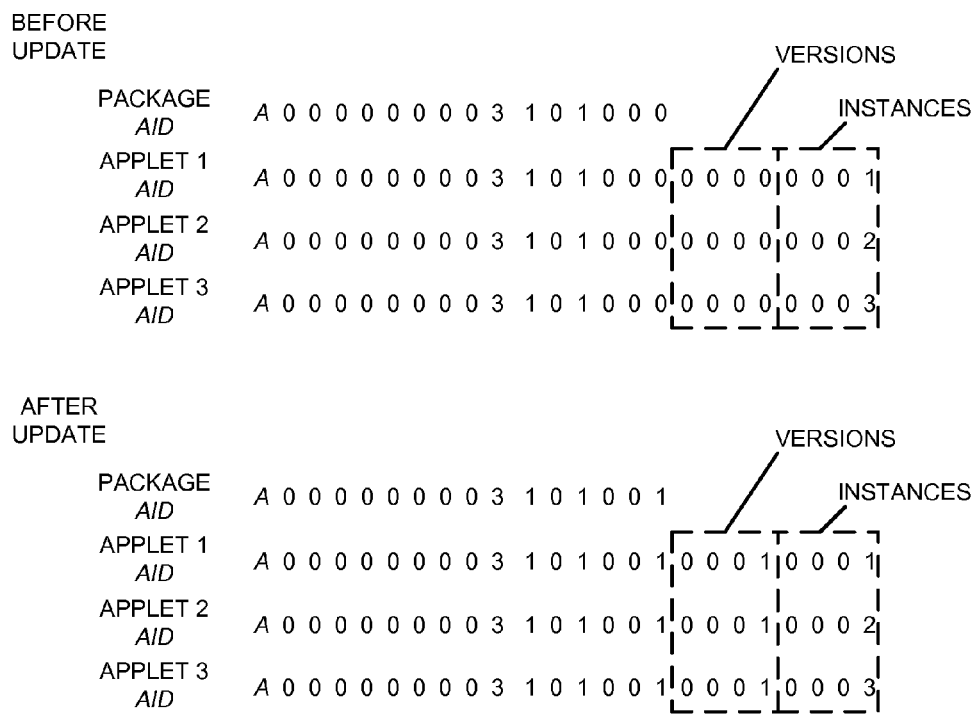
FIG. 8 is a drawing illustrating registry entries in a secure element in one of the electronic devices in FIG. 1 in accordance with an embodiment of the present disclosure.

As noted previously, the registry entries for a package may be updated during the update technique. This is illustrated in FIG. 8, which presents registry entries for a credit-card package with a package AID and three associated instances of credit-card payment applets before and after an update.

In these ways, the update technique may facilitate secure and scalable dissemination, installation and personalization of updates to one or more applets previously installed on electronic devices.

Note that the operations illustrated in FIGS. 5 and 7 may include challenge and response operations, which are not shown for clarity.

In some embodiments of methods 300 (FIG. 3), 400 (FIG. 4) and 600 (FIG. 6), there may be additional or fewer operations. Furthermore, the order of the operations may be changed, and/or two or more operations may be combined into a single operation. For example, the operations in methods 300 (FIG. 3), 400 (FIG. 4) and/or 600 (FIG. 6) may be performed by a different processor in the electronic device, such as a secure enclave processor.

Figure 9:
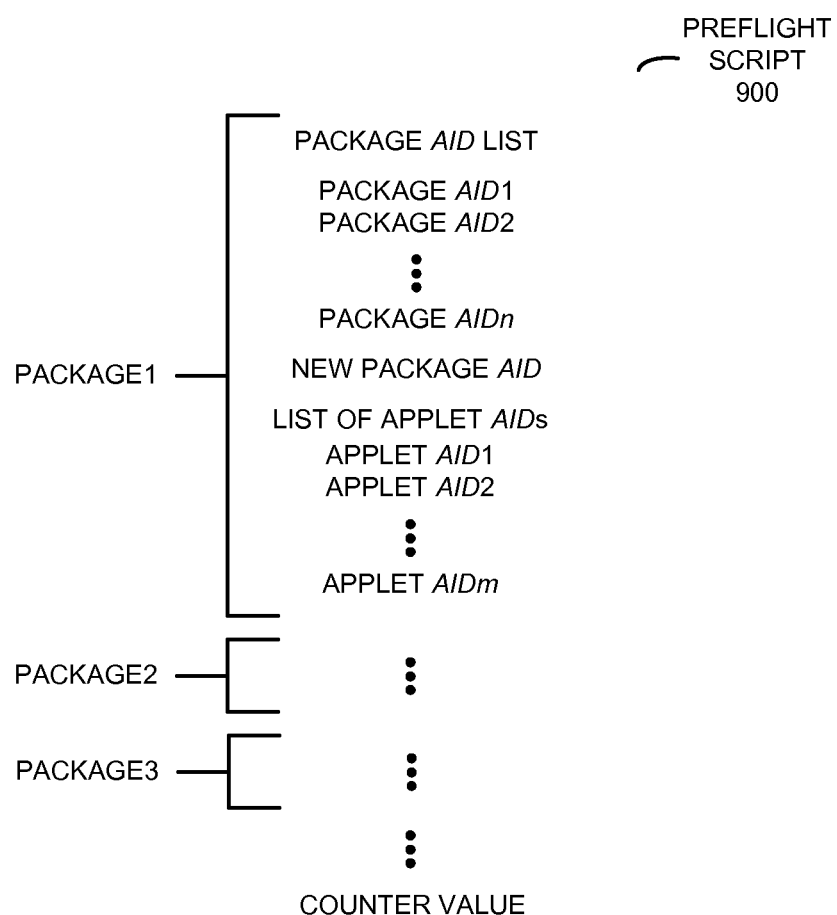
FIG. 9 is a drawing illustrating a preflight script in the method of FIG. 6 in accordance with an embodiment of the present disclosure.

In another exemplary embodiment, the update technique involves a three-phase process. During the first phase, an issuer security domain is selected. Then, a so-called 'preflight script' is sent from a server to the electronic device. This is shown in FIG. 9, which presents a drawing illustrating a preflight script 900 in method 600 (FIG. 6). In particular, preflight script 900 includes one or more packages. Each package includes a package AID list with one or more package AIDs that indicate candidates for migration, a new package AID to upload to the secure element, and a list of applet AIDs with one or more applet AIDs. The package AIDs will be updated to the new package AID and the data associated with the applet AIDs needs to be migrated. Preflight script 900 also includes a counter value that is incremented after preflight script 900 is played once on a given electronic device to prevent replay attacks. Moreover, preflight script 900 may be signed using an encryption key.

When preflight script 900 is executed by the operating system in the secure element, the entry for a given applet (specified by one of the applet AIDs) in the registry is found and transferred to a temporary or a secondary registry. Then, the applet is called using a Java Card exportData( ) and/or exportObject( ) methods (or commands). If the applet is personalized, exportData( ) and/or exportObject( ) transfer the associated data and/or encryption keys and pins to the selected security domain. In particular, exportData( ) transfers the data and exportObject( ) transfers the encrypted keys and pins. Next, a return command is executed. Alternatively, if the applet is not personalized, the return command is executed without calling the applet using the exportData( ) and/or exportObject( ) methods or commands.

Furthermore, the applet is deleted. In particular, the applet is called using a Java Card uninstall( ) method, cleanup is performed at the Applet level, and the return command is executed. Additionally, the operating system in the secure element deletes the applet and a garbage-collection operation is performed to reclaim the memory previously associated with the applet.

During the second phase, the high-end boot loader (such as updating operating system 234 in FIG. 2) is used to replace one or more of the specified packages and to raise a flag, as described previously.

Furthermore, during the third phase a so-called postflight script, which is empty except for a single application protocol data unit command such as import, is executed by the operating system in the secure element. In response, the operating system in the secure element parses the secondary registry. For a given applet, this may involve the operating system in the secure element: creating an instance of the given applet including a copy of the secondary registry; calling the applet using an install( ) method; calling the applet using an import( ) method, which calls an importData( ) and/or an importObject( ) methods; performing cleanup; and performing a garbage-collection operation to reclaim the associated memory.

Note that a new version of an applet that is installed using the update technique may have a new AID or, depending on the use case, may optionally retain the same AID as the previous version of the applet.

While the preceding embodiment used updating or migrating a personalized applet (i.e., one with associated data) as an illustrative example, in other embodiments the update technique may be used to update a non-personalized applet (e.g., one without associated data), such as during manufacturing or configuring of an electronic device in a factory.

Figure 10:
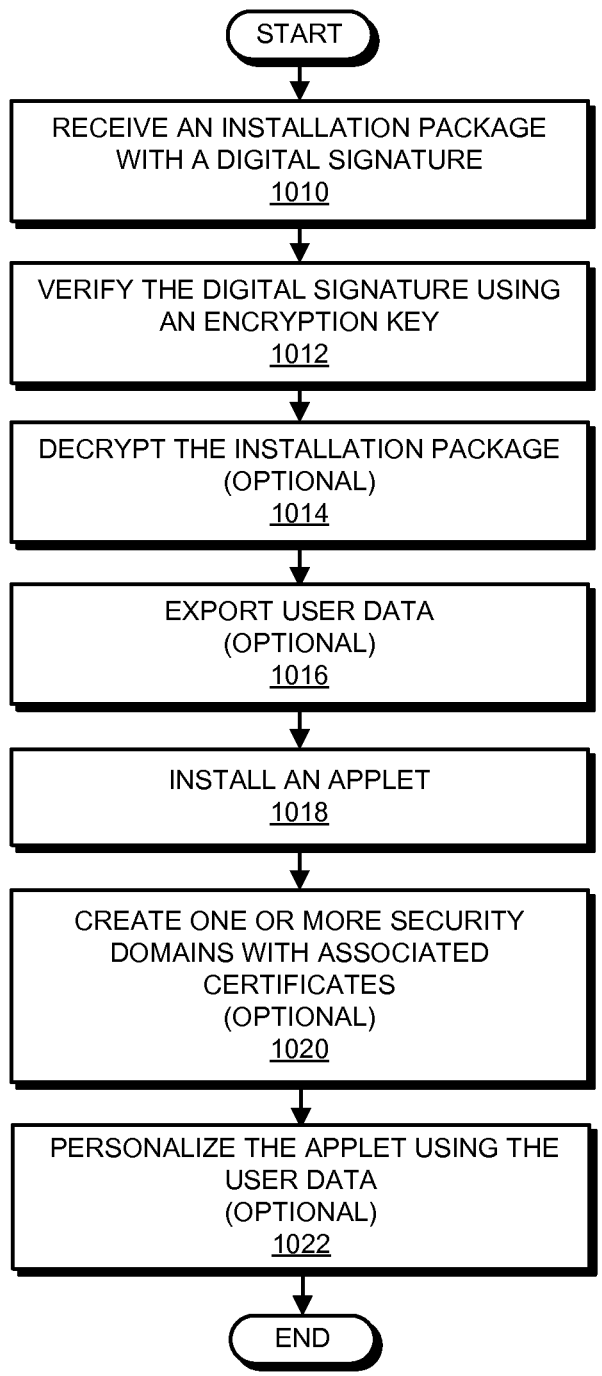
FIG. 10 is a flow diagram illustrating a method for installing an applet in one of the electronic devices in FIG. 1 in accordance with an embodiment of the present disclosure.

We now describe embodiments creating or installing the applet on the secure element in the electronic device. FIG. 10 presents a flow diagram illustrating a method 1000 for installing an applet on an electronic device (such as electronic device 110 in FIG. 1), which may be performed by a processor in a secure element in the electronic device. For example, the processor may execute a program module that includes instructions for operations in method 1000. During operation, the processor receives, from an installing device, an installation package with a digital signature (operation 1010), where the installation package includes an applet to install on the secure element.

Then, the processor verifies the digital signature using an encryption key (operation 1012), which may be associated with a vendor of the secure element. In particular, the digital signature may be associated with a private encryption key of the vendor, and the secure element may verify the digital signature using a public encryption key of the vendor. However, in other embodiments symmetric encryption keys are used. Thus, in these embodiments the digital signature may be associated with the encryption key of the vendor, and the secure element may verify the digital signature using the encryption key of the vendor. Note that the installation package may include multiple applets, and a single cryptographic operation may be used to verify the digital signature for the multiple applets.

In some embodiments, the secure element optionally decrypts the installation package (operation 1014) using a second encryption key, which may be associated with the vendor. This second encryption key may be the same as or different from the encryption key.

Next, the processor optionally exports user data (operation 1016) associated with another applet installed on the secure element.

Furthermore, the processor installs the applet (operation 1018), and optionally personalizes the applet using the user data (operation 1022).

In some embodiments, the applet-migration process is modified so that it can optionally be used to create one or more security domains (on the secure element) with associated certificates (operation 1020). In particular, in order to prevent malicious code from being installed on the secure element, a file in the installation package (which is sometimes referred to as a 'converted applet file' or CAP file) may be digitally signed using one or more certificates, such as private keys of a provider of the electronic device and/or a vendor that provides a component (such as the secure element) in the electronic device. Note that the CAP file may be an object from which other instances of objects on the secure element are instantiated or installed.

However, in order to validate or verify the CAP file, the secure element may need access to one or more corresponding public keys. If numerous instances of the electronic device attempt to access the public keys on a server via the Internet or a network, there may be a delay (because the server is a potential bottleneck with finite resources) and/or additional operations (such as an authentication operation to an issuer security domain in the secure element).

Instead, by modifying the postflight operation in the three-phase applet-migration process described previously, the one or more security domains may be created on the secure element, and these security domain may be injected with the associated certificates (such as one or more public keys). For example, an application protocol data unit command may create the one or more security domains (such as validation authority security domains) and/or may install the associated certificates. Then, when the CAP file is received, the secure element can verify it without accessing a server or performing additional authentication. In particular, the one or more security domains may enable so-called mandated dedicated access privileges (DAP) on the electronic device. In particular, using the certificates, the secure element can confirm the signature(s) on a CAP file (such as one or more signatures on load blocks) that is loaded onto the secure element. Thus, if the CAP file is signed using two private keys, the secure element may be able to perform two-step verification.

While the preceding discussion illustrated operation 1020 with public keys, in other embodiments symmetric-key encryption may be used. Thus, the certificates in the one or more security domains may include symmetric encryption information, asymmetric encryption information and/or secure-hashing-function information.

Note that one or more of the operations in method 1000 may be performed by an installation operating system that is executed by the processor in the secure element, and the installation operating system may be separate from the normal operating system, executed by the processor, which performs other functions of the secure element. (Alternatively, one or more of the operations in method 1000 may be performed by the normal operating system or by a program module executing in an environment associated with the normal operating system.) This approach was illustrated previously for the update technique in FIGS. 4 and 6, and similar approach may be used in the installation technique.

Figure 11:
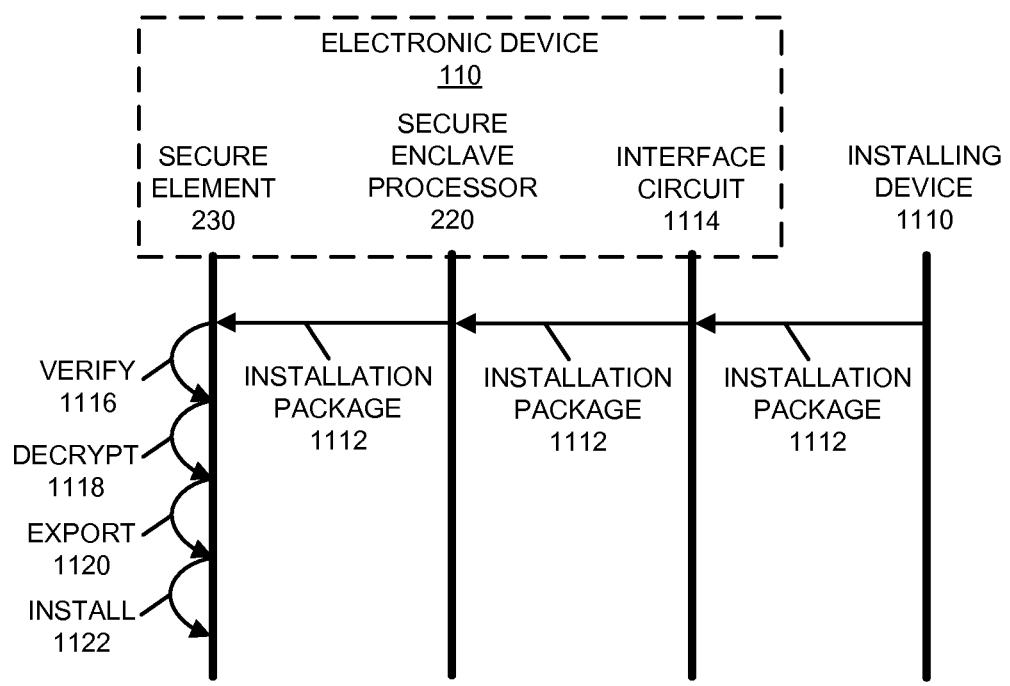
FIG. 11 is a drawing illustrating communication within one of the electronic devices in FIG. 1 in accordance with an embodiment of the present disclosure.

The communication within electronic device 110 during method 1000 is shown in FIG. 11. In particular, installing device 1110 may provide an installation package 1112 (with the applet and the digital signature) to interface circuit 1114, which may forward installation package 1112 to secure enclave processor 220. Then, secure enclave processor 220 (and, more generally, processing subsystem 210 in FIG. 2) may provide installation package 1112 to secure element 230.

Next, secure element 230 verifies 1116 the digital signature using an encryption key (operation 1012), which may be associated with a vendor of secure element 230. Moreover, secure element 230 optionally decrypts 1118 installation package 1112 using a second encryption key, which may be associated with the vendor. This second encryption key may be the same as or different from the encryption key.

Furthermore, secure element 230 optionally exports 1120 user data associated with another applet installed on secure element 230.

Additionally, secure element 230 installs 1122 the applet, and optionally personalizes the applet using the user data. As noted previously, installation 1122 may optionally include creating one or more security domains with associated certificates that can be used to verify load blocks in a CAP file.

In these ways, the installation technique may facilitate secure and scalable dissemination, installation and/or personalization of one or more applets.

Note that the operations illustrated in FIG. 11 may include challenge and response operations, which are not shown for clarity.

In some embodiments of methods 1000 (FIG. 10) and 1100, there may be additional or fewer operations. Furthermore, the order of the operations may be changed, and/or two or more operations may be combined into a single operation. For example, the operations in methods 1000 (FIG. 10) and 1100 may be performed by a different processor in the electronic device, such as a secure enclave processor.

In another exemplary embodiment, the installation technique is used to create an instance of a new applet or a new applet. In particular, the installation technique may involve a modified version of the three-phase process described previously. During the first phase, the preflight script may be empty except for a single application protocol data unit command, which is executed by the operating system in the secure element. For example, the preflight script may install a container with static fields (because of Java Card visibility rules) and/or may uninstall a payment applet.

Moreover, the second phase may be unchanged from that described previously, except that when a package is installed an add method or command may be used instead of a replace method or command.

During the third phase, the postflight script may resemble the preflight script shown in FIG. 9. In particular, the postflight script may include one or more package AIDs. Each package AID may include one or more modules, and each of these modules may include one or more create( ) methods. For example, module AID1 may include create applet1( ), create applet2( ), etc. Moreover, each of the create( ) methods may specify install parameters, such as: privileges, a security domain AID, applet-specific parameters, etc. In addition, there may be a counter value at the end of the postflight script, which may be incremented after execution of the postflight script to prevent or reduce the likelihood of replay attacks.

As an illustration, the installation technique may be used to add a payment applet associated with a new payment network, e.g., in a particular country. Instead of provisioning a new payment-card applet for this network (which may involve creating a network instance, authenticating with a server, creating a security domain, creating encryption keys, etc.), which takes time, is expensive and can result in bottlenecks if multiple users of different electronic devices attempt this simultaneously, in the installation technique a predefined postflight script may be used. This may be faster, more economical and may avoid bottlenecks, e.g., by using a single encryption key for the package. For example, the use of a single encryption key may allow one cryptographic operation to create multiple applets. This approach may allow the applets to be created in parallel with other operations (e.g., the postflight script may be installed with an update to the operating system in the secure element). Consequently, the installation technique may provide a more-scalable solution for securely creating applets on an electronic device.

In yet another embodiment, a hybrid combination of the update technique and the installation technique is used. In this case, the preflight script may include more than the single application protocol data unit command and the postflight script may include an import( ) method after the create( ) methods for the one or more modules in a given package AID. This may allow dynamic provisioning with user data. More generally, this hybrid approach may allow applets to be added, created and/or deleted.

While the preceding discussion illustrated updating and installing of applets that can be personalized with exported user data, in other embodiments there may not be any user data. In these cases, the preflight and/or the postflight scripts may be empty shells. This approach may be useful for non-personalized applets, such as a particular payment applet, a transit applet or a driver's-license applet.

Furthermore, while the preceding embodiments used Java Card applets as an illustration, in other embodiments the applets may be implemented using another programming language, such as Objective-C or another object-oriented programming language.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with an installing device; and
a secure element comprising one or more processors that are configured to execute one or more applications in an environment of the secure element, wherein the secure element is configured to:
receive, from the installing device, an installation package with a digital signature, wherein the installation package comprises a purposed application to install on the secure element and an application identifier associated with the purposed application;
identify another purposed application installed on the secure element by determining a correspondence between the application identifier associated with the purposed application and a second application identifier associated with the another purposed application installed on the secure element;
verify the digital signature using an encryption key associated with a vendor of the secure element;
install the purposed application; and
export data from the another purposed application installed on the secure element; and
after installing the purposed application, personalize the installed purposed application based at least in part on the exported data.

2. The electronic device of claim 1, wherein the installation package comprises multiple purposed applications; and wherein a single cryptographic operation is used to at least verify the digital signature for the multiple purposed applications.

3. The electronic device of claim 1, wherein the secure element is further configured to, prior to installing the purposed application, decrypt the installation package using a second encryption key associated with the vendor.

4. The electronic device of claim 1, wherein the digital signature is associated with a private encryption key of the vendor; and wherein the secure element verifies the digital signature using a public encryption key of the vendor.

5. The electronic device of claim 1, wherein the secure element is configured to perform at least a portion of the installation operation by an installation operating system to be executed by the one or more processors in the secure element; and wherein the installation operating system is separate from a normal operating system, to be executed by the processor, which performs other functions of the secure element.

6. An electronic device, comprising:
an interface circuit, communicatively coupled to an antenna, configured to communicate with an installing device; and
a secure element, wherein the secure element comprises:
a processor configured to execute one or more applications in an environment of the secure element; and
memory, coupled to the processor, which stores a program module configured to be executed by the processor, the program module comprising:
instructions for receiving, from the installing device, an installation package with a digital signature, wherein the installation package comprises a purposed application to install on the secure element;
instructions for identifying another purposed application installed on the secure element, wherein the another purposed application is a previous version of the purposed application;
instructions for verifying the digital signature using an encryption key associated with a vendor of the secure element;
instructions for installing the purposed application;
instructions for exporting user data from another purposed application installed on the secure element; and
instructions for personalizing the installed purposed application based at least in part on the exported user data.

7. The electronic device of claim 6, wherein the installation package comprises multiple purposed applications; and wherein a single cryptographic operation is used to at least verify the digital signature for the multiple purposed applications.

8. The electronic device of claim 6, wherein the program module comprises instructions for, prior to installing the purposed application, decrypting the installation package using a second encryption key associated with the vendor.

9. The electronic device of claim 6, wherein the digital signature is associated with a private encryption key of the vendor; and wherein the secure element verifies the digital signature using a public encryption key of the vendor.

10. The electronic device of claim 6, wherein at least a portion of the installation operation is performed by an installation operating system to be executed by a processor in the secure element; and wherein the installation operating system is separate from a normal operating system, to be executed by the processor, which performs other functions of the secure element.

11. A secure element for use in an electronic device, comprising:
a processor configured to execute one or more applications in an environment of the secure element; and
memory, coupled to the processor, which stores a program module configured to be executed by the processor, the program module comprising:
instructions for receiving, from an installing device, an installation package with a digital signature, wherein the installation package comprises a purposed application to install on the secure element;
instructions for identifying another purposed application installed on the secure element, wherein the another purposed application is a previous version of the purposed application;
instructions for verifying the digital signature using an encryption key associated with a vendor of the secure element;
instructions for installing the purposed application; and
instructions for exporting user data from the another purposed application installed on the secure element; and
instructions for personalizing the installed purposed application based at least in part on the exported user data.

12. The secure element of claim 11, wherein the installation package further comprises multiple purposed applications; and wherein a single cryptographic operation is used to verify the digital signature for the multiple purposed applications.

13. A computer-program product for use in conjunction with a secure element in an electronic device, the computer-program product comprising a non-transitory computer-readable storage medium and a computer-program mechanism embedded therein, to install a purposed application on the secure element in the electronic device, the computer-program mechanism comprising:
instructions for executing one or more applications in an environment of the secure element using one or more processors of the secure element;
instructions for receiving, from an installing device, an installation package with a digital signature, wherein the installation package comprises a purposed application to install on the secure element and an application identifier associated with the purposed application;
instructions for identifying another purposed application installed on the secure element by determining a correspondence between the application identifier associated with the purposed application and a second application identifier associated with the another purposed application installed on the secure element;
instructions for verifying the digital signature using an encryption key associated with a vendor of the secure element;
instructions for installing the purposed application on the secure element;
instructions for exporting data from another purposed application;
instructions for uninstalling the another purposed application; and
instructions for personalizing the installed purposed application based at least in part on the exported data, wherein the exporting, the uninstalling, and the personalizing occur within a security domain on the secure element, wherein the security domain includes a certificate installed by the secure element.

14. The computer-program product of claim 13, wherein the installation package comprises multiple purposed applications; and wherein a single cryptographic operation is used to verify the digital signature for the multiple purposed applications.

15. An electronic device, comprising:
an interface circuit configured to communicate with an installing device; and
a secure element communicatively coupled to the interface circuit and configured to:

receive, from the installing device, an installation package with a digital signature, wherein the installation package comprises an application to install on the secure element;
identify another application installed on the secure element, wherein the another application is a previous version of the application;
verify the digital signature using an encryption key associated with a vendor of the secure element;
install the application on the secure element using an operating system of the secure element, wherein the operating system is separate from a primary operating system that performs primary functions of the secure element;
export user data from the another application installed on the secure element; and
personalize the installed application using the exported user data.

16. The electronic device of claim 1, wherein the correspondence is determined between the application identifier associated with the purposed application and the second application identifier associated with the another purposed application by browsing a registry for a registry entry associated with the another purposed application.

17. The electronic device of claim 6, wherein the instructions for identifying the another purposed application installed on the secure element comprises determining a correspondence between an application identifier associated with the purposed application and a second application identifier associated with the another purposed application installed on the secure element by browsing a registry for a registry entry associated with the another purposed application.

18. The secure element of claim 11, wherein the instructions for identifying the another purposed application installed on the secure element comprises determining a correspondence between an application identifier associated with the purposed application and a second application identifier associated with the another purposed application installed on the secure element by browsing a registry for a registry entry associated with the another purposed application.

19. The computer-program product of claim 13, wherein the correspondence is determined between the application identifier associated with the purposed application and the second application identifier associated with the another purposed application by browsing a registry for a registry entry associated with the another purposed application.

20. The electronic device of claim 15, wherein the identification of the another purposed application installed on the secure element comprises determining a correspondence between an application identifier associated with the purposed application and a second application identifier associated with the another purposed application installed on the secure element by browsing a registry for a registry entry associated with the another purposed application.

* * * * *